United States Patent
Jhanwar et al.

(10) Patent No.: US 7,562,346 B2
(45) Date of Patent: Jul. 14, 2009

(54) SOFTWARE COMPONENTIZATION FOR BUILDING A SOFTWARE PRODUCT

(75) Inventors: Raj Jhanwar, Bothell, WA (US); Vijayachandran Jayaseelan, Bellevue, WA (US); Michael Grier, Woodinville, WA (US); Michael James Day, Kirkland, WA (US); Brian McNeill, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 493 days.

(21) Appl. No.: 10/653,701

(22) Filed: Sep. 2, 2003

(65) Prior Publication Data

US 2004/0093593 A1    May 13, 2004

(51) Int. Cl.
G06F 9/44        (2006.01)
G06F 9/445       (2006.01)

(52) U.S. Cl. .................. 717/120; 717/121; 717/100; 717/169; 717/175

(58) Field of Classification Search ......... 717/120–175; 709/201–246
See application file for complete search history.

(56) References Cited

U.S. PATENT DOCUMENTS

| | | | |
|---|---|---|---|
| 5,499,357 A | | 3/1996 | Sonty et al. |
| 5,950,011 A | | 9/1999 | Albrecht et al. |
| 5,963,743 A | | 10/1999 | Amberg et al. |
| 5,974,572 A | | 10/1999 | Weinberg et al. |
| 5,999,740 A | | 12/1999 | Rowley |
| 6,038,399 A | * | 3/2000 | Fisher et al. ............ 717/178 |
| 6,157,928 A | | 12/2000 | Sprenger et al. |
| 6,161,051 A | | 12/2000 | Hafemann et al. |
| 6,199,204 B1 | | 3/2001 | Donohue |
| 6,292,941 B1 | | 9/2001 | Jollands |
| 6,367,072 B1 | | 4/2002 | Justice et al. |
| 6,381,742 B2 | | 4/2002 | Forbes et al. |
| 6,427,236 B1 | | 7/2002 | Chamberlain et al. |
| 6,434,744 B1 | | 8/2002 | Chamberlain et al. |
| 6,487,713 B1 | * | 11/2002 | Cohen et al. ............ 717/105 |
| 6,493,871 B1 | | 12/2002 | McGuire et al. |

(Continued)

FOREIGN PATENT DOCUMENTS

EP    0 817 014 A2    1/1998

(Continued)

OTHER PUBLICATIONS

Szyperski, "Component Technology: What, Where, and How?," Proceedings of the 25th International Conference on Software Engineering, 2003, p. 684, IEEE Computer Society, Washington DC, U.S.A.

(Continued)

*Primary Examiner*—Insun Kang
(74) *Attorney, Agent, or Firm*—Senniger Powers LLP

(57) ABSTRACT

A componentization schema representing files from which an operating system or other software product is built. According to the schema, a component object represents one or more of the files. The component object has a manifest that identifies the component and specifies any dependencies between the component and other objects. Grouping objects according to the dependencies specified in manifests permits building the software product. A feature object defined by at least one component object represents a feature of the software product and a product object defined by at least one feature object represents the software product.

32 Claims, 11 Drawing Sheets

U.S. PATENT DOCUMENTS

| | | | |
|---|---|---|---|
| 7,228,541 B2 * | 6/2007 | Gupton et al. | 717/175 |
| 2002/0144248 A1 | 10/2002 | Forbes et al. | |
| 2003/0046681 A1 | 3/2003 | Barturen et al. | |
| 2003/0056102 A1 | 3/2003 | Aho et al. | |
| 2003/0120678 A1 | 6/2003 | Hill et al. | |
| 2003/0120688 A1 | 6/2003 | Hill et al. | |
| 2003/0121024 A1 | 6/2003 | Hill et al. | |
| 2003/0145317 A1 | 7/2003 | Chamberlain | |

FOREIGN PATENT DOCUMENTS

| | | |
|---|---|---|
| JP | 10003382 | 6/1998 |
| WO | 01/93031 A1 | 12/2001 |
| WO | 01/98926 A2 | 12/2001 |

OTHER PUBLICATIONS

Green, "Component-Based Software Development: Implications for Documentation," Proceedings of the 17th Annual International Conference on Computer Documentation, 1999, pp. 159-164, ACM Press, New York, U.S.A.

Helander et al., "MMLite: A Highly Componentized System Architecture," 1998, pp. 96-103, ACM Press, New York, U.S.A.

Unknown, "Microsoft Announces Release of Whistler Embedded" Beta 1, XP-002398008, Dec. 2000, microsoft.com/presspass/press/2000/dec00/Whistler.

Bailey, "Maximum RPM—Taking the Red Hat Package Manager to the Limit," XP-002179959, Feb. 17, 1997, URL:http://www.rpm.org/maximum-rpm.ps.gz, 90 pgs.

Franken, Using RPM-SuperVisor, XP-002289340, v.1.11, Nov. 6, 2001, 16 pgs.

European Patent Office Communication forwarding European Search Report, Jun. 6, 2007, 4 pgs.

Zhong Chen: "Building Eclipse Instance Messenger," Carleton University, Apr. 25, 2003, pp. 1-49, XP-002443352, URL:http://www.scs.carleton.ca/{arpwhite/documents/honoursProjects/paul-chen-2003.pdf.

"JAR File Specification," Jun. 7, 2003, pp. 1-13, XP-002443360, URL://web.archive.org/web/20030607203613/ http://java.sun.com/J2se/1.4.2/docs/guide/jar/jar.html.

* cited by examiner

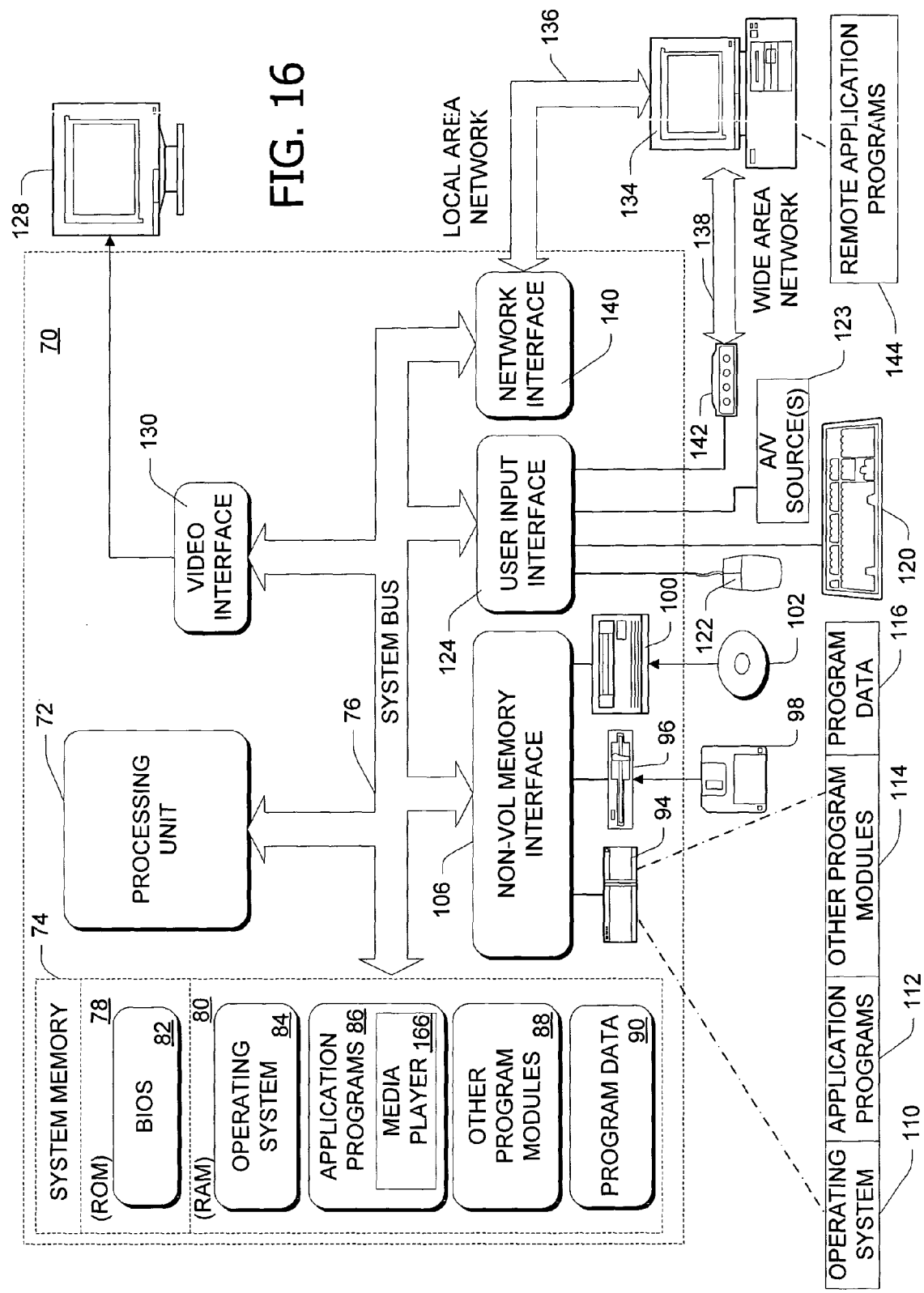

SOFTWARE COMPONENTIZATION FOR BUILDING A SOFTWARE PRODUCT

TECHNICAL FIELD

Embodiments of the present invention relate to the field of software architecture. In particular, embodiments of this invention relate to a componentized architecture for a software product, including an operating system.

BACKGROUND OF THE INVENTION

As software products become larger and more complex, it is increasingly more difficult to create new products based on existing software products and to service these products as demanded by market and competitive needs. An operating system (OS) is an example of a relatively large, complex software product.

The operating system manages and schedules the resources of a computer or device in which it resides, and provides various function modules and interfaces that may be used by applications to accomplish various tasks. A conventional computer generally executes its operating system to manage various aspects of the computer as it is running. For example, the operating system is typically responsible for managing access to storage devices as well as input and/or output devices, and controlling the execution of one or more additional applications. Installation usually occurs before the computer executes the operating system (e.g., by copying multiple files from a distribution medium such as a CDROM onto a hard disk of the computer).

A conventional operating system has a large number of files (e.g., thousands) for instructions and/or data. Such instructions, when executed by the computer, provide the operating system's functionality. In addition to the large number of files, the operating system usually has a large number of dependencies among files. For instance, many files may require the installation of one or more other files for their intended functionality to be carried out. Although the operating system's manufacturer may know of such dependencies at the time of installation, it can be difficult for a user, administrator, or other software developer to learn about these dependencies. This can prove troublesome, as software developers may not know what data or instructions in other files affect the particular file(s) with which they are concerned. Similarly, an administrator or user troubleshooting a malfunctioning computer may not know which files are applicable to the problem without knowledge of the dependencies.

Moreover, a typical operating system is generally monolithic in nature. Those skilled in the art are familiar with conventional operating systems, in which both server and client OS products are built from a giant central file that contains all of the binary files. In this example, a setup executable must specify which files are included in the different products. Thus, relationships between various parts of each product are difficult to understand. This lack of information hinders the ability to service pieces of an operating system during its lifecycle. In other words, it becomes more difficult for developers and others to keep track of all the different modules and files of the operating system to ensure that they will work properly together and individually as the operating system becomes bigger and more complicated.

As an example, a particular OS product may be sold as a "home" version while a premium product with additional features may be sold as a "professional" version. In this instance, the home and professional products will often include branding information and other references interspersed throughout the many binary files making up the respective products. Unfortunately, creation and servicing of products is extremely laborious and requires extensive testing due to relationships between binary files and the existence of these branding references (each of which must be changed for a new product).

The operating system may be modified (e.g., updated or serviced) in any of a wide variety of manners, such as by adding or replacing one or more particular binary files, by any of a wide variety of people (e.g., a user, administrator, software developer other than the operating system developer, etc.). When such modifications occur, it increases the difficulty of identifying dependencies among files existing on the computer. For example, a change to a single file may necessitate a change to other dependent files. Further, it becomes even more difficult to troubleshoot a malfunctioning computer or update the operating system because the user or administrator cannot easily know exactly what functionality is or should be installed on the computer.

Accordingly, software componentization is desired to address one or more of these and other disadvantages and to allow, among other things, building improved operating systems.

SUMMARY OF THE INVENTION

Embodiments of the invention overcome one or more deficiencies in the prior art by representing a software product, such as an operating system, as a collection of components. An aspect of the invention includes introducing several abstractions to build the software product in a componentized way. In this manner, embodiments of the invention facilitate creation of new products based on the componentized product and servicing the product. The component definition may be used to describe application components generally, i.e., any application can be described using this component definition. In the alternative, the component definition may be used to describe operating system components more specifically. Moreover, the features of the present invention described herein are less laborious and easier to implement than currently available techniques as well as being economically feasible and commercially practical.

Briefly described, a method embodying aspects of the invention builds a software product from a plurality of files. The method includes organizing the files into objects. In this instance, a plurality of the objects are representative of components and the components each include at least one of the files. The method also includes identifying each component with a manifest and specifying, with the manifests, one or more dependencies between the components and other objects. Grouping the objects according to the dependencies specified in the manifests permits building the software product.

Another embodiment of the invention relates to one or more computer-readable media. Objects stored on the media, including a plurality of component objects, are used to build a software product from a plurality of files. Each component object includes one or more of the files and a manifest. The manifest contains metadata identifying the component objects and specifying dependencies between the component objects and one or more other objects. The media also includes at least one feature object corresponding to a feature of the software product. The feature object includes one or more selected objects grouped according to the dependencies specified in the manifests.

In yet another embodiment, a componentization schema represents one or more files from which a software product is built with a component object. A manifest associated with the component object identifies it and specifies one or more dependencies between the component object and at least one other object. The schema also includes a feature object and a product object. The feature object, which is defined by at least one component object, represents a feature of the software product. The product object, which is defined by at least one feature object, represents the software product.

Computer-readable media having computer-executable instructions for performing methods of componentization embody further aspects of the invention.

Alternatively, the invention may comprise various other methods and apparatuses.

Other features will be in part apparent and in part pointed out hereinafter.

BRIEF DESCRIPTION OF THE DRAWINGS

FIG. 16 is a block diagram illustrating exemplary components of a computer for use FIG. 1.

Corresponding reference characters indicate corresponding parts throughout the drawings.

DETAILED DESCRIPTION OF THE INVENTION

Figure 1:
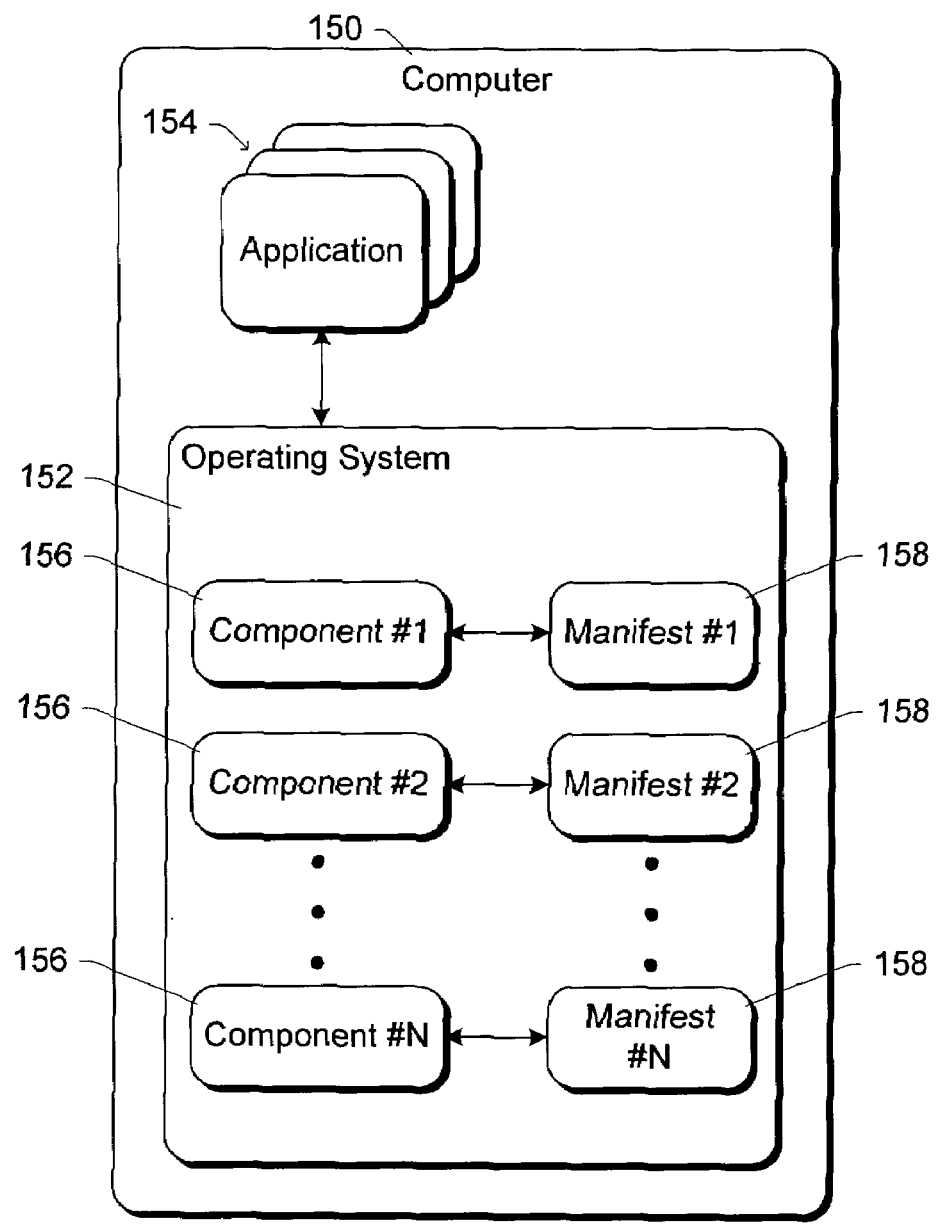
FIG. 1 is a block diagram illustrating an exemplary computer according to embodiments of the present invention.

Referring now to the drawings, FIG. 1 illustrates an exemplary computing device 150 in accordance with certain embodiments of the invention. The computing device 150 is illustrated as having a software product such as operating system 152 and one or more application programs 154.

Operating system 152 is the fundamental software control program for computing device 150, performing various functions including providing a user interface, managing the execution of one or more applications 154, and controlling the input of data from and output of data to various input/output (I/O) devices. Application programs 154 represent one or more of a wide variety of software application programs that may be executed on computing device 150. Examples of such application programs 154 include educational programs, reference programs, productivity programs (e.g., word processors, spreadsheets, databases), recreational programs, utility programs (e.g., communications programs), etc. Application programs 154 may be installed on computing device 150 by the user, or alternatively pre-installed by the manufacturer and/or distributor of computing device 150.

The operating system 152 of FIG. 1 separates its functionality into multiple components 156 such as component #1 through component #N in the illustrated embodiment. Each component 156 has a corresponding manifest 158 such as manifest #1 through manifest #N, respectively. The components 156 include a collection of one or more files (or file identifiers). The files may include software instructions such as an executable file, a dynamic-link library (DLL), or a component object module (COM). The files may also include data for use by one or more of the components 156. In one implementation, the files (e.g., data and/or instructions) corresponding to particular functionality of the operating system 152 are grouped together in the same component 156. For example, there may be a games component, a communications component, and a file system component. The grouping of files that result in the componentization may be static or alternatively may change over time. In one example, updates to operating system 152 may result in selected files from certain components 156 being removed and added to other components 156.

Referring further to FIG. 1, each manifest 158 includes information describing the corresponding component 156. Any of a wide variety of metadata regarding the corresponding component 156 may be included in each manifest 158. In one implementation, the manifest 158 identifies the version of the corresponding component 156 as well as which other components 156, if any, the corresponding component 156 is dependent on. By way of example, in order for one or more files in component 156 to properly execute, one or more other files (e.g., a DLL file) from another component may need to be installed on computing device 150. In this example, manifest 158 would indicate that component 156 depends on the other component.

Due to the complexity and size of existing operating systems, it is becoming increasingly difficult to create new products to meet market or competitive needs. Today's operating systems are more monolithic in nature and, thus, it can be difficult to understand the relationships between various constituent parts. The lack of this information makes servicing an operating system very difficult during the lifecycle of the product. To overcome these and other problems, embodiments of the present invention componentize the operating system. In other words, the invention permits representing a software product as a collection of components. Aspects of the invention involve several abstractions used to build an operating system in a componentized way to facilitate creation of new products and servicing the existing product. The abstractions can be applied to any software product including application programs and any operating system.

A component definition schema exemplifying aspects of the invention introduces several abstractions, namely, components (also referred to as assemblies), categories, features, packages, products, and SKUs (stock keeping units). In this instance, component 156 represents a reusable, sharable, self-describing atomic unit of distribution, servicing, and/or binding. It is the most basic abstraction that describes the component itself and all relevant information (i.e., metadata) used for installing, servicing, and/or binding to necessary resources in a declarative manner.

As described in greater detail below with respect to one embodiment of the invention, a category object 162 (see FIG. 4) represents a mechanism to group a common set of components 156; a feature object 164 (see FIG. 5) represents a composition of components 156 and/or features 164 and is used as a building block for creating a product object 166 (see FIG. 7); and a package object 168 (see FIG. 6) represents a composition of components 156, features 164, categories 162, and/or other packages 168. As an example, the package object 168 is used to group a set of components 156 for administrative purposes. Further, the product object 166 in this embodiment represents a top level composition of features 164 and/or components 156 and a SKU object 170 (see FIG. 8) represents a shipping mechanism for products 166 (e.g., one SKU 170 may contain multiple products 166).

The component definition described herein may also be used to describe application components generally rather than operating system components specifically. In other words, any application may be described using this component definition.

The componentization architecture according to embodiments of the invention defines the concepts, component repository, and programming model for managing components both during design-time and run-time. There are several strategic benefits of componentization including agility, speed, supportability, and increased revenue opportunities. Creating a new software product, represented by a product or SKU object, is made much easier, even across client and server lines. It is a relatively simple task of selecting the right components and providing some additional configuration to build a new product. The agility in creating new products in a relatively short time provides the ability to compete efficiently and avoid missing a market opportunity. For example, it is possible to offer additional components to later add to a current product, which allows a customer to upgrade to a premium product, which increases the overall number of licenses, etc. All of these additional activities may result in additional revenues for the products.

Componentization also facilitates reducing the number of product images that an original equipment manufacturer (OEM) or corporation must maintain, which can lead to great cost savings. According to at least one embodiment of the invention, most of the component information is declarative such that components can be installed in an offline manner. This reduces the time it takes to install the whole product on a target device and results in great cost reductions for OEMs, corporations, end users and the like as well as increased customer satisfaction.

Those skilled in the art recognize the importance of service as part of the product cycle. Servicing a componentized product according to embodiments of the invention is relatively simple because it is easy to assess the impact of the changes based on the declarative information provided by each component. It is also much easier to test the components in a more isolated environment to improve the testing efficiency. In turn, this reduces the overall fragility in the software product.

Figure 2:
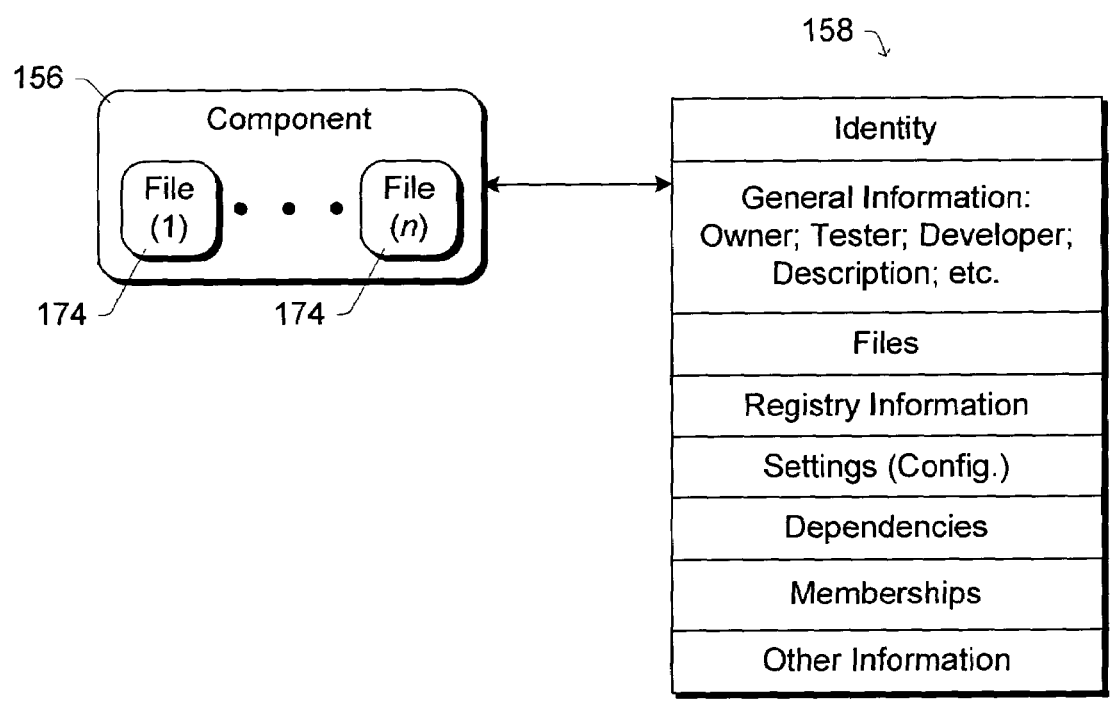
FIG. 2 is an exemplary block diagram illustrating a component and corresponding manifest of FIG. 1.

The component definition schema described herein covers the information that component 156 describes in order to install, upgrade service, and bind to appropriate resources. In this regard, FIG. 2 illustrates exemplary component 156 and corresponding manifest 158 in accordance with certain embodiments of the invention. According to embodiments of the invention, each component 156 is represented by a corresponding manifest 158. Component 156 includes at least one file 174 and may optionally include more than one (n) files. Although illustrated as files in FIG. 2, component 156 may alternatively include pointers or other identifiers of one or more of files 174 rather than the actual files.

The component 156 corresponds to manifest 158. In the illustrated example, manifest 158 includes a component identifier that identifies component 156 (e.g., by name or some other unique identifier). This correspondence can alternatively be maintained in different manners, such as inclusion of an identifier (not shown) of manifest 158 in component 156, storage of both component 156 and manifest 158 (or identifiers thereof) in a data structure that maintains an inherent correspondence between component 156 and manifest 158, etc. Manifest 158 may be an extensible markup language (XML) document.

As shown in the exemplary listing of FIG. 2, manifest 158 also includes a dependent component list that identifies zero or more components that component 156 is dependent on. The identified dependent components are those components that also need to be installed as part of the operating system image in order for component 156 to function properly. In the illustrated example, the identifiers identify components that are necessary for component 156 to function properly, but alternatively may include components that should be included (i.e., components preferred by component 156 to have as part of the operating system but which are not necessary). In addition to identity and dependencies, manifest 156 in this example also describes a number of other details of component 156, namely, general information (including owner, tester, developer, description, etc.), resources (including files, registry information, etc.), settings (configuration), memberships, and other information.

The manifest 158 in an alternative embodiment may also include a priority order and a version indicator to aid in installation and/or upgrading.

Alternatively, some or all of the information maintained in manifest 158 may be maintained in different locations. By way of example, some or all of the information may be incorporated into component 156 of FIG. 1.

The example of APPENDIX A further illustrates aspects of the invention with respect to manifest 158.

The following description provides further details regarding the major abstractions used in a componentization architecture exemplifying aspects of the invention.

Figure 3:
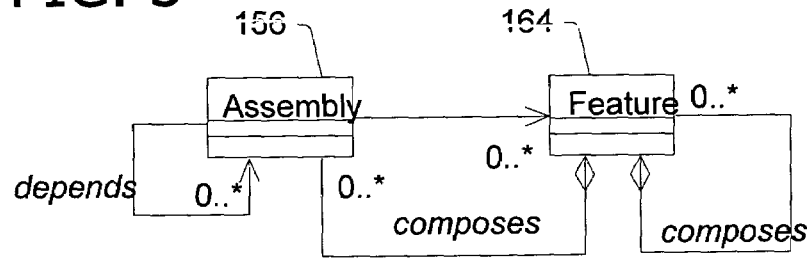
FIG. 3 to FIG. 8 illustrate an exemplary component definition schema according to embodiments of the present invention.

As described above, the object referred to as component 156 (or assembly) represents a reusable or sharable self-describing atomic unit of distribution, servicing, and binding. In the embodiment of FIG. 3, components 156 may depend on other components 156 and/or features 164 to run, i.e., they exhibit dependencies relative to these other objects. Components 156 may also be members of different open groups, namely, categories 162. In this instance, a developer-friendly, extensible, multi-part property "bag" referred to as "identity" identifies each component 156. The component identity has the following attributes, for example: name, version, processor architecture, language (e.g., "us-eng" or "jpn"), build type (e.g., free or debug), and originator's identification. The name attribute takes the form of a locale independent string that describes the particular component 156 in one embodiment. A four-part version number, which generally follows a "major.minor.build.revision" format, for example, is provided by the version attribute of the identity. Cryptographically secure information that allows the component identity to be secure is found in the originator's ID attribute of the identity.

As set forth above, each component 156 is made up of one or more files as well as an associated manifest 158. Manifest 158 describes the details of component 156, as shown in FIG. 3. In the embodiment of FIG. 3, the object referred to as component or assembly may have dependencies with respect to another component 156, a category 162, and/or a feature 164.

Figure 4:
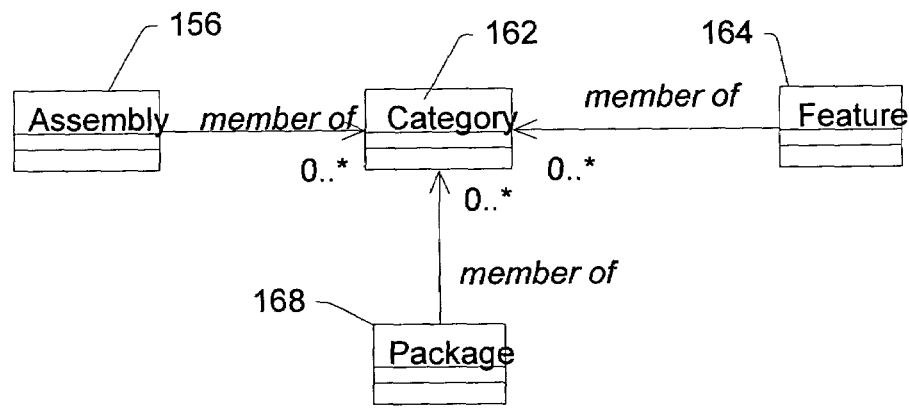

The category object 162 shown in FIG. 4 defines an open group in which membership information is present with the member of the category rather than being present in a category manifest. For example, one category 162 may be established to group one or more components 156 related to text editors such as Notepad and Wordpad. Categories 162 are also identified using an identity mechanism similar to that of components 156. In one embodiment, categories 162 have details such as identity, general information, and other information.

Figure 5:
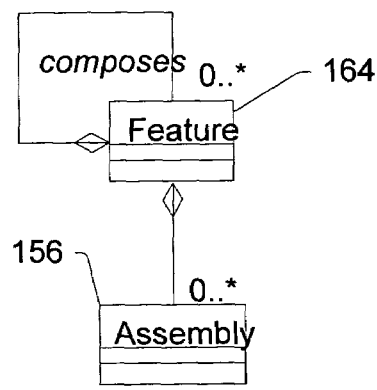

Referring now to FIG. 5, the feature object 164 represents a composition of components 156 and/or other features 164. Features 164 are used as software product building blocks and can be added or removed from installation. Rather than depending upon other objects, features 164 have inclusive relationships with respect to components 156, other features 164, and categories 162. In other words, features 164 do not have dependencies according to this embodiment. As an example, one feature object 164 represents a consolidated Web browser feature and another feature object 164 represents a media player application, both of which are shipped with an operating system. Feature 164 consists of identity, general information (e.g., owner, tester, developer, description, etc.), memberships, compositions, and other information. In one embodiment of the invention, the feature identity is similar to the component identity in structure and is used to identify each feature 164. Features 164 may be members of multiple different categories 162 (see FIG. 4).

Figure 6:
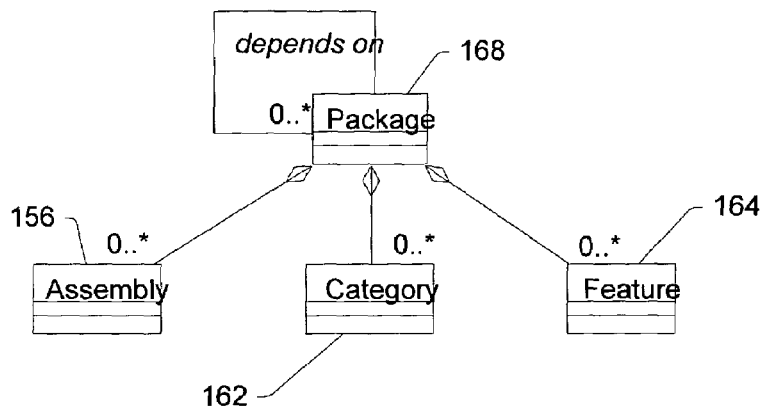

FIG. 6 diagrammatically illustrates the package object 168. As shown, package 168 is a composition of components 156, features 164, categories 162, and other packages 168. In contrast to categories 162, packages 168 are closed groups. Packages 168 are primarily used for administrative purposes. For example, a home version of an OS may be shipped with four different packages 168 indicated by "cab1", "cab2", "cab3" and "cab4". The package objects 168 in this example are groups formed for setup purposes. Packages 168 specify dependencies only on other packages 168 in the embodiment of FIG. 6. Each package 168 according to the componentization definitions described herein consists of details such as identity, general information, membership, compositions, dependencies, and other information.

Figure 7:
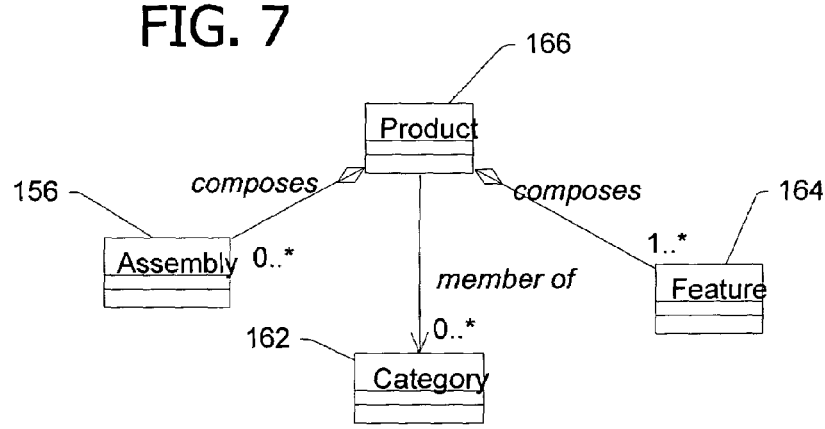

The product object 166 of FIG. 7 represents a top level composition of features 164 and/or components 156. It also has properties that are used to configure the composed features 164 and components 156. According to embodiments of the invention, a product designer selects features 164 for product 166 (see FIG. 13). The product object 166 contains details on identity, general information, compositions, and other information.

Figure 8:
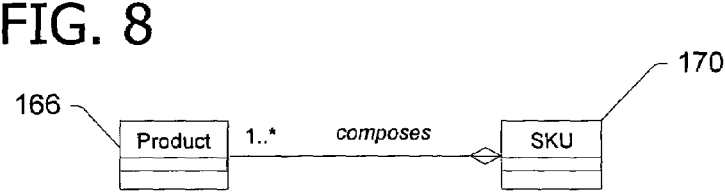

Referring now to FIG. 8, SKU object 170 represents the shipping medium for products 166 (i.e., what products are included on a disc for shipping). Suitable shipping media include floppies or compact discs and web download cabinet files. Also, SKU 170 may consist of more than one product 164 (see FIG. 13). At least one embodiment of the invention generates a SKU manifest using a SKU designer tool. Similarly to the other abstractions described above, SKU 170 contains identity, general information, products, and other information.

Figure 9:
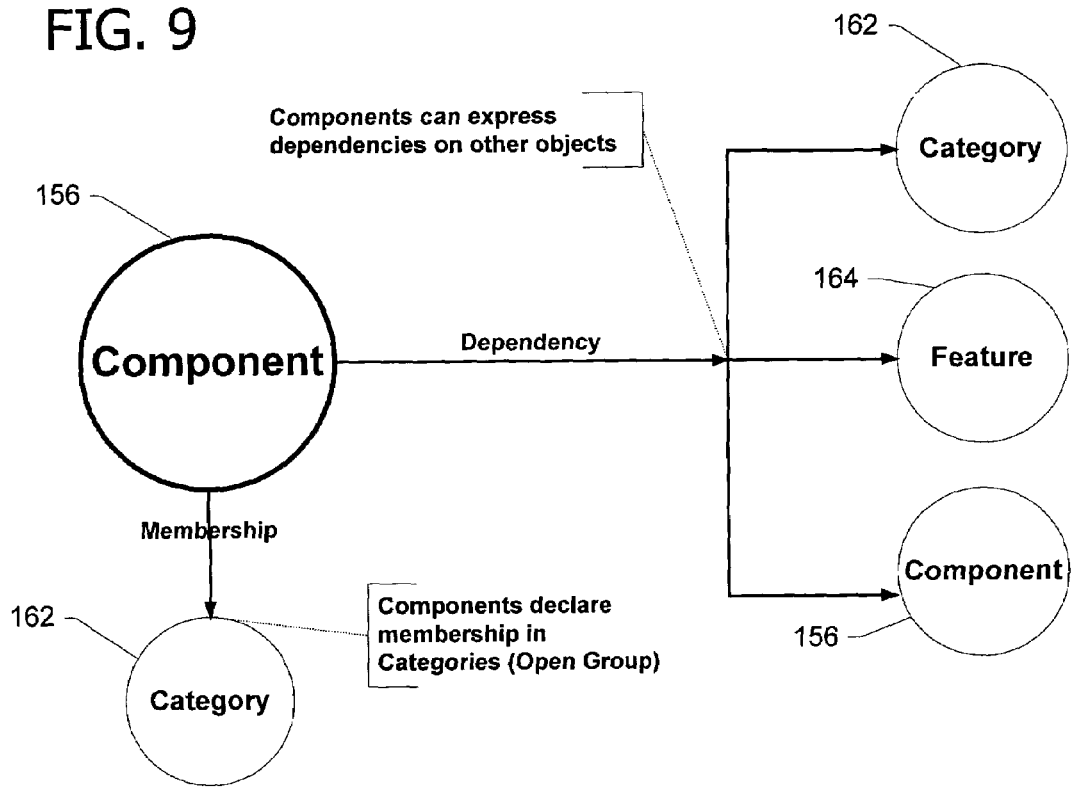
FIG. 9 to FIG. 12 further illustrate objects of the component definition schema of FIGS. 3-8.
Figure 10:
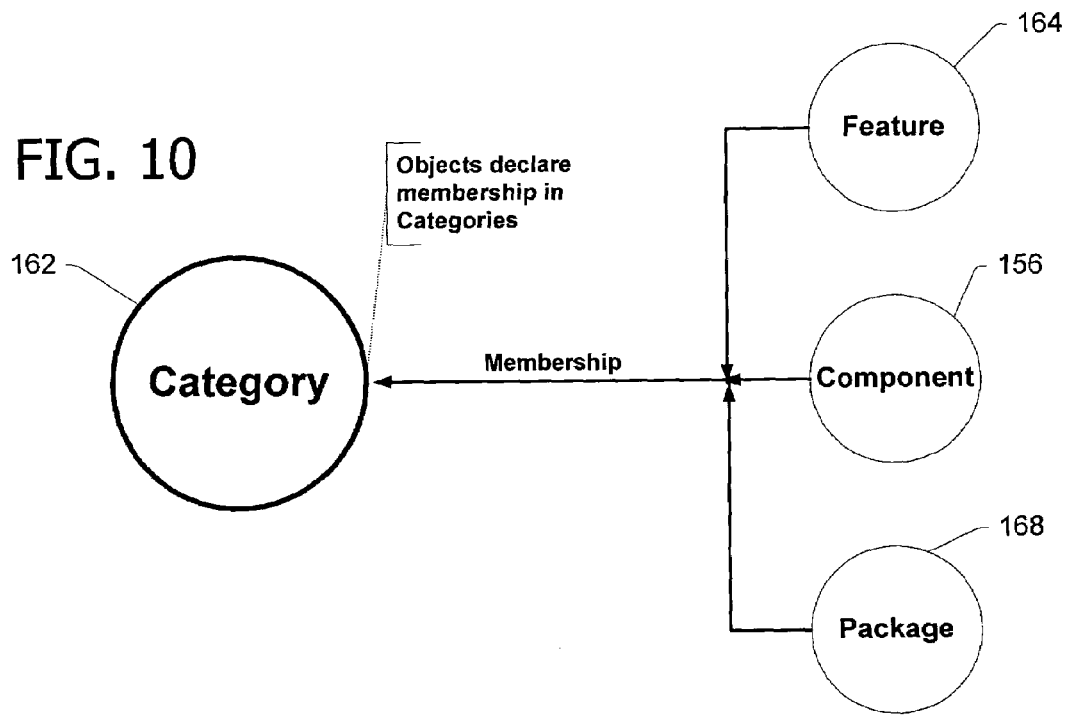
Figure 11:
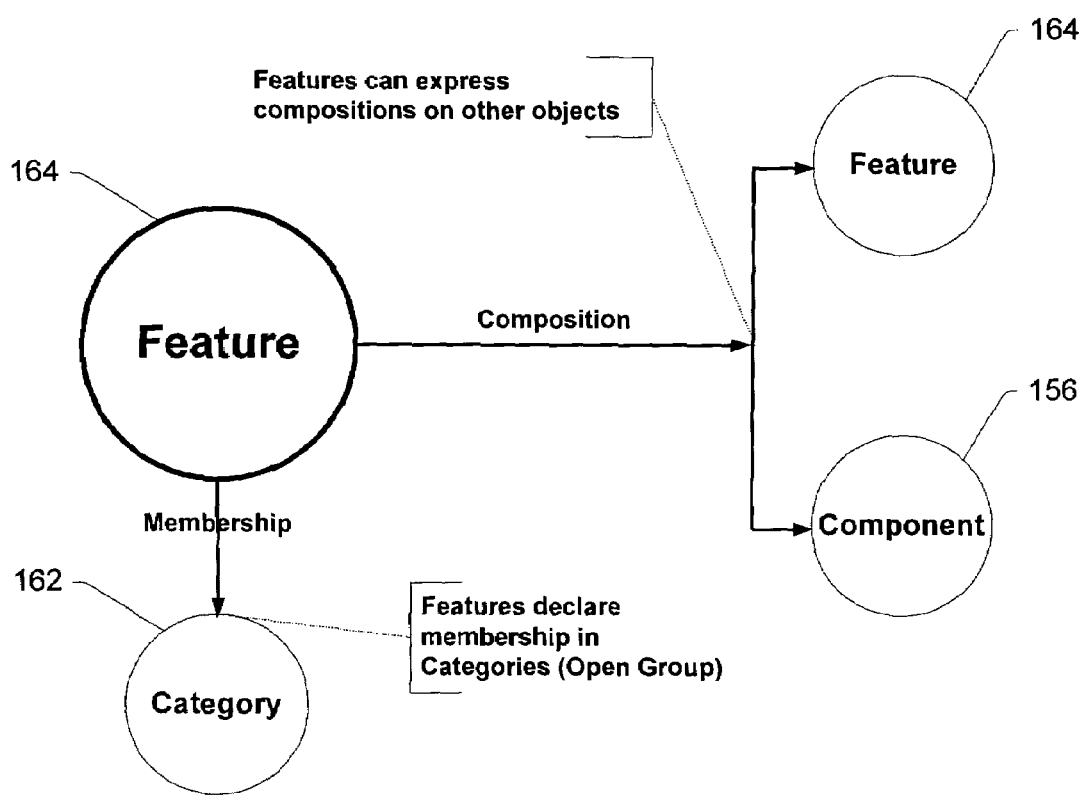
Figure 12:
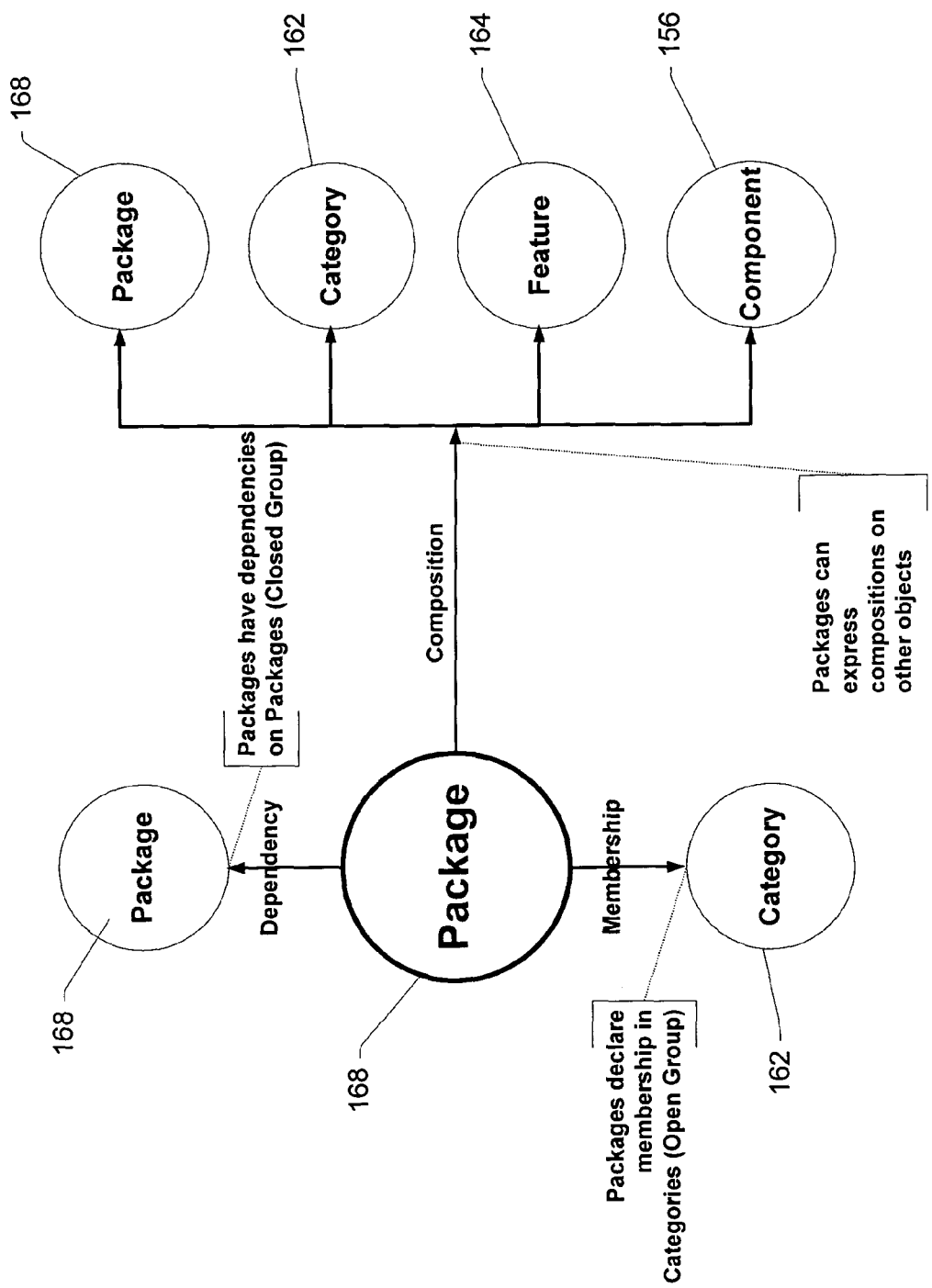

FIG. 9 to FIG. 12 are further illustrative of an exemplary relationships between component 156 and other objects. In particular, FIG. 9 shows that component 156 may be dependent on one or more of the binary files found in one or more categories 162, one or more features 164, and/or one or more other components 156. In addition, component 156 may declare membership in category 162. In the exemplary relationship diagram of FIG. 10, category 162 may be used to group one or more features 164, one or more components 156, and/or one or more packages 168. As described above, the category object 162 represents an open group into which other objects declare their membership. FIG. 11 further illustrates that feature 164 includes one or more other features 164 and/or components 156 and that feature 164 may declare membership in one or more of the categories 162. Referring now to FIG. 12, package 168 represents a grouping of one or more other packages 168, categories 162, features 164, and/or components 156. In this instance, package 168 may belong to an open group such as category 162 or depend from a closed group such as another package 168.

Figure 13:
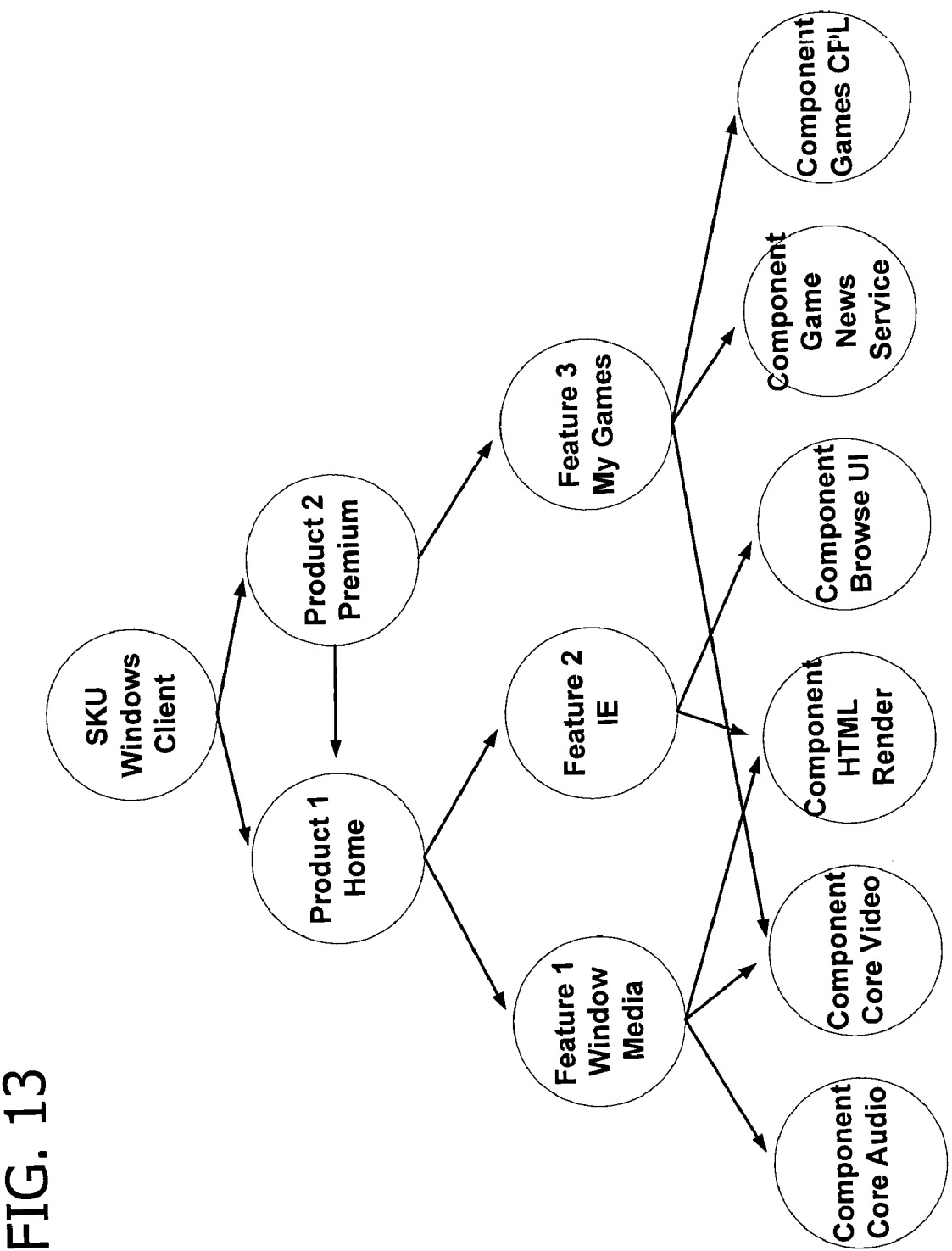
FIG. 13 illustrates an exemplary design process according to embodiments of the present invention for selecting components to be included in a software product.

FIG. 13 provides an example of grouping various components 156 of OS binary files to define features 164. The features 164 are then grouped to define products 166, which are in turn included for shipping with SKU 170. Different computers may have different operating system images that are based on the same operating system. For example, different OEMs may customize the same operating system in different ways (e.g., so that the operating system boots with an initial screen identifying the OEM, different default settings may be used, etc.). Different functionality may also be included (e.g., screen savers, backgrounds or themes, software applications such as communications programs, games, etc.). This additional functionality can be provided by the OEM, or alternatively other manufacturers or distributors. Thus, many different components may be part of the operating system of which only a subset are actually installed on a particular computer as an operating system image. An OEM-specific component and manifest set, on the other hand, includes additional components that can be installed by the OEM as part of the operating system image.

The operating system can be updated for any of a wide variety of reasons. By way of example, bug fixes to certain files of certain components may be available, new functionality (e.g., replacement or additional files) in a component may be available, new components may be available, etc.

Additionally, a new component may be installed as part of the operating system along side a previous component rather than replacing it. This allows different applications to use whichever version of the component they prefer (or are programmed to use).

By way of example, an OEM may offer various basic computer configurations corresponding to home use, business use, server use, and so forth. Each one of the configurations in this example is based on the same operating system but includes different functionality. Additional networking and communications functionality may be included in the server configuration that is not included in either the home or business configurations, and additional games or audio playback functionality may be included in the home configuration that is not included in the business or server configurations. FIG. 13 shows an exemplary premium product that includes a basic home product.

In one embodiment, building the software product is the act of creating a run-time image from a repository of components mentioned in a product object. Building generally occurs in an offline manner, i.e., a run-time image for machine X is created on machine Y. Dependencies are fully resolved from the top level product. Once the dependencies are resolved, each node in the dependency tree is installed to the target. Target denotes the installation that is being created in an offline manner. Installation of each component involves installing each resource (e.g., registry keys and files) that is part of the component and putting an entry in the installed component repository to track the installed components.

Figure 14:
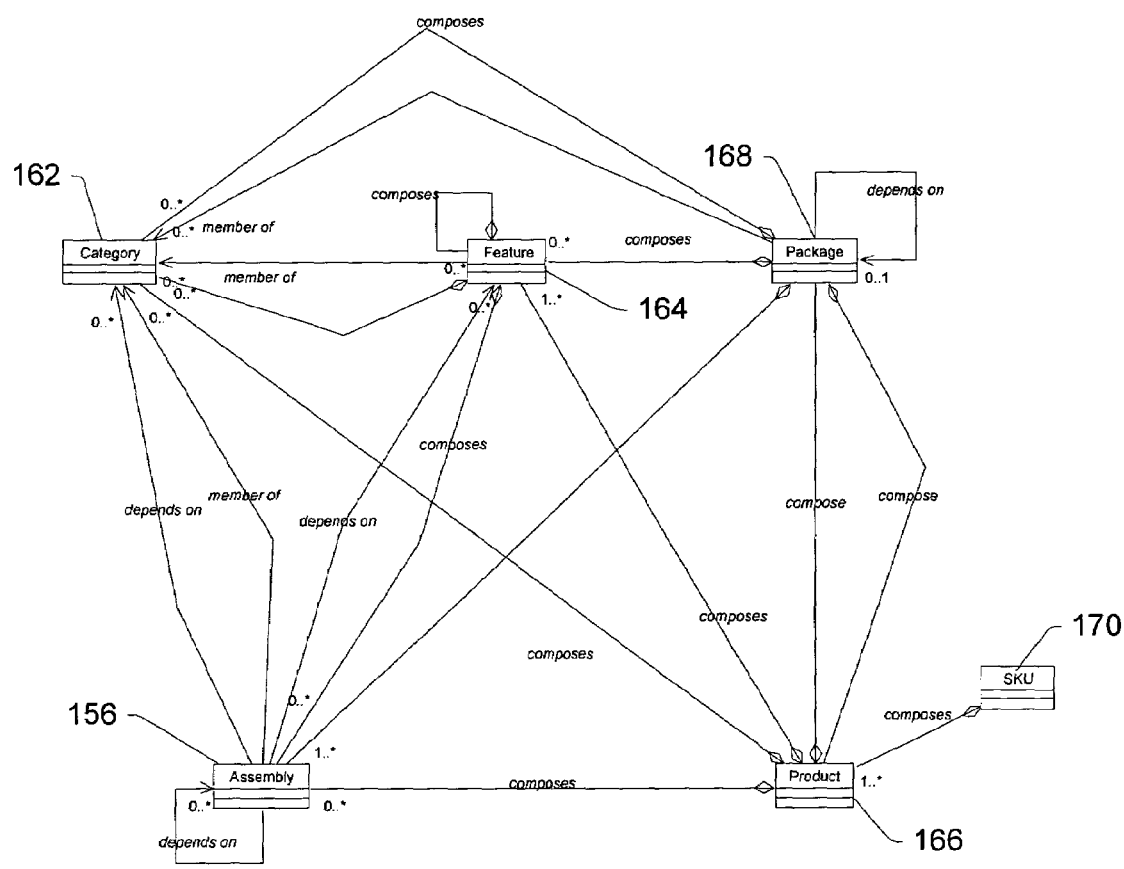
FIG. 14 illustrates an exemplary programming object model according to embodiments of the present invention.

FIG. 14 shows first level abstractions of the programming model according to embodiments of the invention. In particular, the exemplary diagram illustrates different first level objects (or classes), using, for example, Unified Modeling Language (UML). The objects are exposed to programmers using UML in this example. Each of the interfaces directly maps to the first level concepts of the componentization.

The operating system installation process is simplified greatly by the componentization of the operating system. OEM-specific functionality can be easily added to a computer by including the appropriate component and corresponding manifest. Further, updates to the operating system for improved functionality, bug fixes, and the like can be easily incorporated into the installation process by simply replacing the corresponding components. Alternatively, an additional update component and manifest set may be available to an operating system installation station that includes such updates.

Figure 15:
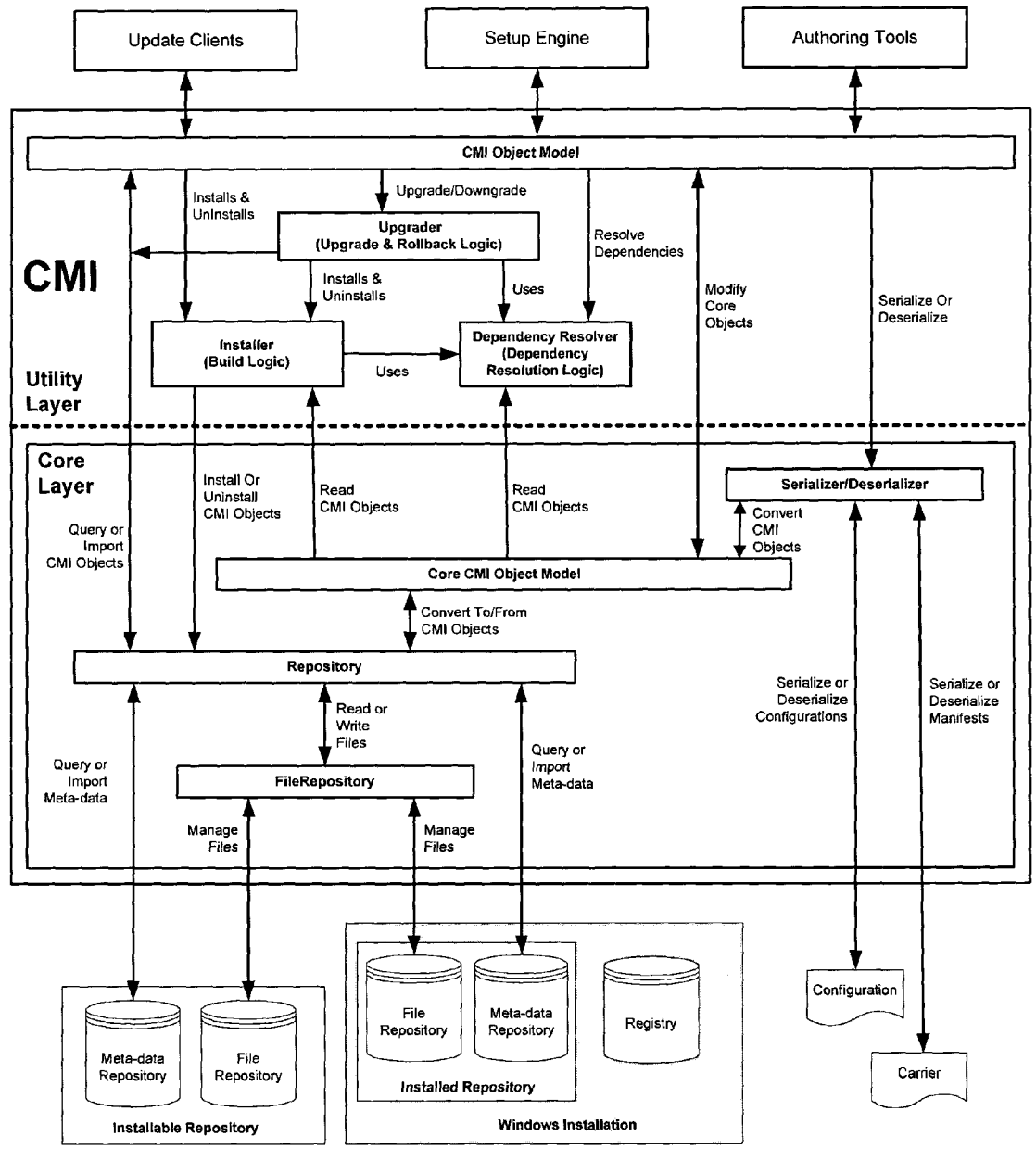
FIG. 15 is a block diagram illustrating an exemplary componentization architecture for use with the component definition schema of FIGS. 3-8.

FIG. 15 illustrates exemplary componentization architecture for use with the invention. The extensible architecture shown in FIG. 15 permits the building of an OS installation, including installing and uninstalling components, and enables product/SKU agility. Moreover, the architecture provides infrastructure for servicing a running OS and an OS image, provides an inventory of OS components; and lives on the installed system. The componentization architecture provides a generalized framework for creation and management of components. It also allows for building a run-time image from a configuration in a generic manner. A component management interface (CMI) is the programming model interface that may be used by different consumers to access functionality exposed by the componentization architecture. The tools can be generally divided into the following classes: design-time tools; run-time tools; and build-time tools. Design-time tools are the tools used at the design time (e.g., a component designer to design or create components and target designer to design or create a configuration). Run-time tools are used to manage the existing components on a run-time image (installation). This might include functionality such as an option component manager (OCM), which manages the components installed on a system. Another example of a run-time tool can be a servicing client that talks with a remote server to get component updates and updates the components installed on an installation. Build-time tools are used in the build lab. They are primarily used to create a run-time image from a configuration.

As shown in FIG. 15, CMI has a core layer and a utility layer. The CMI core layer consists of different blocks of functionality that are generally exposed and consumed as well known interfaces. This layer consists of a core CMI object model, a repository and file repository, and serializer/de-serializer. The core CMI object model block exposes multiple different first class abstractions as interfaces to CMI clients for ease of programming. They generally reflect componentization abstractions in a relatively easy to use format. For example, IAssembly abstracts the "component" concept. The abstractions in this embodiment do not have any functionality associated with them. They are a collection of attributes that can be retrieved and set through the methods exposed on the abstractions. The following list includes some of the abstractions that are exposed through an interface in the core CMI object model: IAssembly; IFeature; ICategory; IPackage; IProduct; ISku; IConfiguration; IRepository.

A component repository in the example of FIG. 15 is used for managing components that are present in one of the repositories. As described above, each component has metadata (i.e., information about the data) and the actual data (i.e., files of a component). Metadata is accessible through a metadata repository interface (IRepository) whereas data is accessible through a file repository interface (IFileRepository). In one embodiment, the metadata repository interface is implemented using a relational database to store and index the metadata of components. The file repository interface allows clients to get to the component data (files) in a consistent way.

The component metadata and data interfaces are split under the component repository interface in FIG. 15 to allow for different pluggable metadata repository implementations based on different scenarios. For example, on a design machine one could use a SQL metadata repository since available storage and memory might not be constrained but on a run-time system metadata repository might be backed by a small footprint database (e.g., registry) to take care of tight memory requirements.

A serializer and deserializer interface allows first class objects in CMI to be serialized to and deserialized from a text file. For example, an XML serializer and deserializer reads and writes XML files. The serializer and deserializer generally read and write out carriers and configurations as described below.

The files that carry any of the first class abstractions in serialized format are referred to as either carriers or manifests. The carriers provide a means of populating the component repository data, i.e., tools create or edit a serialized instance of component in a carrier file and the component repository interface allows for the import of the carrier into the component repository.

The primary advantage of using a carrier for information exchange is that it allows the tools to be decoupled from the component repository. Another advantage is that while importing the carrier information, the data can be imported into the component repository in a more consistent (or complete) format. The serializer and deserializer interface segregation also allows for other kinds of carriers (e.g., INF) to be implemented.

Configuration is a serialized representation of the CMI's IConfiguration object, which represents a collection of components and settings used to build a run-time image. The reason configuration is serialized in a separate file rather than a carrier file is that configuration cannot be imported into the database.

The CMI utility layer consists of blocks of functionality that frequently changes. The blocks of functionality are exposed and consumed as well known interfaces in the embodiment of FIG. 15. The utility layer includes blocks for an installer, an upgrader, a dependency resolver, the CMI object model, and clients. The installer block has the logic for installing (or building) and removing a particular componentization abstraction exposed by the core layer. For example, IAssembly is installed and removed from the OS installation in an online or offline manner. The logic of installing and removing assemblies is present in this block. All the core abstractions are installed and removed using "IInstallable" interface. The implementation of these methods changes for each core abstraction. For example, for assembly there will be an installer abstraction called "IAssemblyInstaller". IAssemblyInstaller aggregates "IAssembly" interface and implements "IInstallable" to install and uninstall an assembly instance.

This type of particular functionality binding with core abstractions allows the implementation of assembly install logic to change as needed without affecting the core IAssembly interface. The same holds true for other core abstractions also.

The upgrader block has the logic for upgrading and downgrading a particular core abstraction on a windows installation. For example, IAssembly is upgraded or downgraded from the OS installation in an online or offline manner. The logic of upgrading and downgrading assemblies is present in this block. All the core abstractions are upgraded and downgraded using "IUpgradable" interface.

There is a separate implementation of these methods for each core abstraction. Since install and uninstall functionality is needed during the upgrade process, "IUpgradable" inherits from "IInstallable" to re-use the existing functionality of install and uninstall. For example, the assembly has an upgrader abstraction called "IAssemblyUpgrader". IAssemblyUpgrader aggregates "IAssembly", "IAssemblyInstaller" and implements "IUpgradable" to upgrade and downgrade an assembly instance on a windows installation. Again, this kind of binding allows the implementation of assembly upgrade logic to change as needed without affecting the core IAssembly interface and install or uninstall logic. The same holds true for upgrade functionality of other core abstractions also.

The dependency resolver block implements the dependency resolution logic for a particular core abstraction. In this instance, for each core abstraction this block has logic in terms of dependency resolution either in an automated or manual fashion. The dependency resolver is extensible for the client programs to extend the default dependency resolution functionality as needed in a particular client context. This block's functionality is exposed through "IDependencyResolver" interface. The method of resolving dependencies returns a tree of CMI objects or instance objects based on the scenario where it is being used. Dependency resolution is generally done with respect to a configuration or a repository according to at least one embodiment of the invention. The repository can be either installable or installed repository.

Generally, on run-time systems, dependency resolutions happen against an installed repository and existing configuration, whereas in a design-time scenario the dependency resolution happens against an installable repository and a current configuration which is being edited.

The CMI object model is an aggregated form of CMI core object model and different pieces of functionality exposed in the utility layer. The core CMI object model is also exposed out for authoring tools to manipulate the abstractions directly while serializing and de-serializing the carriers (or manifests).

One of the key things to notice in the above architecture is that the same programming model is advantageously exposed for design-time, run-time and build-time scenarios. This helps in keeping the object model consistent with respect to different requirements and helps in programmer's productivity. This also helps in re-using a single implementation of CMI to be used for different scenarios such as design and run-time and is therefore more maintainable in comparison to different implementation for design-time and run-time scenarios.

FIG. 16 shows one example of a general purpose computing device in the form of a computer 70. In one embodiment of the invention, a computer such as the computer 70 is suitable for use as computer 150.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 16 illustrates operating system 84, application programs 86, other program modules 88, and program data 90.

The computer 70 may also include other removable/non-removable, volatile/nonvolatile computer storage media. For example, FIG. 16 illustrates a hard disk drive 94 that reads from or writes to non-removable, nonvolatile magnetic media. FIG. 16 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 84, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 16, provide storage of computer readable instructions, data structures, program modules and other data for the computer 70. In FIG. 16, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 16 include a local area network (LAN) 136 and a wide area network (WAN) 138, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 134, or other appropriate mechanism. In a networked environment, program modules depicted relative to computer 70, or portions thereof, may be stored in a remote memory storage device (not shown). By way of example, and not limitation, FIG. 16 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics including mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 70 executes computer-executable instructions such as those described herein organize the files into objects. In this instance, at least some of the objects are representative of components and the components each include at least one of the files. In accordance with the computer-executable instructions, a manifest identifies each component and specifies any dependencies between the component and other objects. Grouping the objects according to the dependencies specified in the manifests permits building the software product.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

Information in this document, including uniform resource locator and other Internet web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

or manifest). Each carrier contains only one instance of features or categories or packages or products or SKUs. An example of a notepad manifest follows:

```xml
<?xml version="1.0" encoding="UTF-16"?>
<!-- edited with XMLSPY v5 U (http://www.xmlspy.com) by vijayj (ms) -->
<!-- edited with XML Spy v4.4 U (http://www.xmlspy.com) by Vijay Jayaseelan (ms) -->
<assembly manifestVersion="1.0" authors="vijayj" company="Microsoft"
copyright="Microsoft" displayName="Notepad" lastUpdateTimeStamp="2002-07-
31T09:23:00" owners="none" released="false" testers="none"
supportInformation="http://www.microsoft.com" description="Unicode and non-unicode
text file editor." xmlns="urn:schemas-microsoft.com:asm.v2">
    <assemblyIdentity name="notepad" version="1.0.0.0"
processorArchitecture="x86" language="neutral" buildType="release"/>
    <dependency>
        <dependentCategory name="Notepad Language Category"
version="1.0.0.0" processorArchitecture="x86" language="*" buildType="release"
selection="one"/>
    </dependency>
    <dependency>
        <dependentAssembly>
            <assemblyIdentity name="Windows Shell" version="1.0.0.0"
processorArchitecture="x86" language="*" buildType="release"/>
        </dependentAssembly>
    </dependency>
    <file name="notepad.exe" sourcePath="%_NTTREE%\"/>
    <memberships>
        <categoryMembership name="Text Editors" version="1.0.0.0"
processorArchitecture="x86" language="*" buildType="release"/>
    </memberships>
    <registryKeys>
        <registryKey keyName="HKCU\Notepad\Settings\"/>
        <registryKey keyName="HKCU\Notepad\Settings\Font\">
            <registryValue name="Name" valueType="REG_SZ"
value="Arial"/>
            <registryValue name="Size" valueType="REG_DWORD"
value="10"/>
        </registryKey>
    </registryKeys>
    <propertyTypes>
        <propertyType name="DefaultFont" valueType="string" access="public"
readOnly="false" value="Arial" regularExpression="(Arial)|(Lucida Console)|(Courier)">
            <registryLocation keyName="HKCU\Notepad\Settings\Font\">
                <registryValue name="Name" valueType="REG_SZ"
value="Arial"/>
            </registryLocation>
        </propertyType>
    </propertyTypes>
</assembly>
```

For example, embodiments of the present invention are scalable and extensible. The component repository may be able to track relatively few components (e.g., hundreds) on a run-time system to a relatively huge number of components (e.g., hundreds of thousands) on a design-time system. The schema embodied by the invention is also extensible enough so that additional metadata and new components can be added by different product divisions and third parties. The programming model is extensible enough so that people can add functionality to the core componentization framework in a consistent manner to extend it.

As various changes could be made in the above constructions and methods without departing from the scope of the invention, it is intended that all matter contained in the above description and shown in the accompanying drawings shall be interpreted as illustrative and not in a limiting sense.

APPENDIX A

Data Storage and Format: Authoring tools create the component, feature, category, package, product and SKU. In this example, they are represented in an XML file (called a carrier

What is claimed is:

1. A method of building a software product from a plurality of files, said software product comprising a plurality of features, said method performed by a computer comprising:
   organizing the plurality of files into objects;
   defining a feature of the plurality of features of the software product to be built, said
   defined feature including at least one component, said component being represented by at least
   one of the objects, wherein:
      a second feature of the plurality of features of the software product to be built includes the at least one component of the defined feature, the defined feature is not a dependent component of the second feature, and the second feature is not a dependent component of the defined feature;
   identifying each component of the plurality of features with an individual corresponding manifest uniquely associated therewith, wherein the manifests each specify one or more dependencies between the associated component and at least one of the objects;

wherein said at least one of said objects is representative of a category of the files in the software product;

declaring, by one or more other objects, membership in the category; wherein each of the one or more other objects declaring the membership in the category is representative of at least one of the following: a component, a feature, and a package; and building the software product by grouping the objects according to the dependencies specified by the manifests associated with the components of the plurality of features of the software product to be built.

2. The method of claim 1 wherein at least one of said objects is representative of the defined feature of the software product and further comprising grouping selected objects to define the feature of the software product to be implemented by the files of the selected objects.

3. The method of claim 2 wherein the selected objects grouped to define the feature include one or more of the components grouped according to the dependencies specified in the manifests.

4. The method of claim 2 wherein the feature is independent of other objects.

5. The method of claim 2 wherein the selected objects grouped to define the feature include at least one object representative of another feature.

6. The method of claim 1 further comprising installing the selected components as an operating system image on a computer.

7. The method of claim 1 wherein said files comprise binary files.

8. The method of claim 1 wherein the category comprises an open group.

9. The method of claim 1 wherein each of the objects is representative of at least one of the following: a component, a category, a feature, a product, a stock keeping unit, and a package.

10. The method of claim 9 wherein the package comprises a closed group.

11. The method of claim 1 wherein said components are dependent on objects representative of one or more of the following: another component; a category; and a feature.

12. The method of claim 1 wherein each of the components includes identifying information.

13. The method of claim 1 further comprising generating metadata associated with the components to describe different software products as a function of different sets of selected components.

14. One or more computer-readable storage media have computer-executable instructions for performing the method of claim 1.

15. One or more computer-readable storage media having objects stored thereon for use in building a software product from a plurality of files, said software product comprising a plurality of features, said computer-readable storage media comprising:

a plurality of component objects, said component objects each including one or more of the files and an individual corresponding manifest uniquely associated therewith, said manifests containing metadata identifying the associated component object and specifying dependencies between the associated component object and one or more other objects;

a plurality of feature objects including a first feature object corresponding to a first feature of the plurality of features of the software product to be built, said first feature object including one or more selected objects grouped according to the dependencies specified in the manifests, wherein at least one of the selected objects is included in a second feature object corresponding to a second feature of the plurality of features of the software product to be built, and wherein the first feature object is not a dependent component object of the second feature object and the second feature object is not a dependent component object of the first feature object; and a category object for grouping the one or more selected objects that are related objects to build the software product; wherein the objects in the category object declare membership in the category object and include one or more of the following: a component object, a feature object,
and a package object.

16. The computer-readable storage media of claim 15 wherein the selected objects in the first feature object are grouped according to dependencies between the objects and include one or more of the following: a component object and a feature object.

17. The computer-readable storage media of claim 15 wherein the feature objects are independent of other objects.

18. The computer-readable storage media of claim 15 wherein the software product comprises an operating system.

19. The computer-readable storage media of claim 15 wherein said files comprise binary files.

20. The computer-readable storage media of claim 15 wherein the category object comprises an open group.

21. The computer-readable storage media of claim 15 wherein each of the objects is representative of at least one of the following: a component, a category, a feature, a product, a stock keeping unit, and a package.

22. The computer-readable storage media of claim 21 wherein the package object comprises a closed group.

23. The computer-readable storage media of claim 15 wherein said components are dependent on one or more of the following: another component object; a category object; and a feature object.

24. The computer-readable storage media of claim 15 wherein each of the objects includes identifying information.

25. A computer readable storage medium having files stored thereon as a function of a componentization schema, said componentization schema comprising:

a component object including one or more files from which a software product is built, said component object having a corresponding manifest uniquely associated therewith, said manifest identifying the component object and specifying one or more dependencies between the component object and at least one other object;

a feature object for representing a feature of the software product to be built, said feature object including at least one component object, wherein:

the at least one component included in the feature object is included in a second feature object for representing a second feature of the software product to be built, the feature object is not a dependent component object of the second feature object, and the second feature object is not a dependent component object of the feature object, wherein each component object of said feature object and second feature object is identified with an individual corresponding manifest uniquely associated therewith, wherein the manifests each specify one or more dependencies between the associated component and at least one of the objects;

a product object for representing the software product, said product object being defined by at least the feature object; and a category object for representing a common set of component objects grouped according to the dependencies specified in the manifests to build the software product, said category being an open group permitting one or more component objects in the common set to declare membership in the open group; wherein the category object includes members representative of one or more of the following: a component object, a feature object, and a package object.

26. The computer readable storage medium of claim 25 wherein the feature object is independent of other objects.

27. The computer readable storage medium of claim 25 wherein the feature object includes selected component objects grouped according to the dependencies specified in the manifests associated therewith.

28. The computer readable storage medium of claim 25 further comprising a package object representing a closed group having one or members representative of at least one of the following: a component object, a category object, a feature object, and a package object.

29. The computer readable storage medium of claim 28 wherein the package object is only dependent on another package object.

30. The computer readable storage medium of claim 25 further comprising a stock keeping unit object representing one or more computer-readable media containing the software product, said stock keeping unit object being defined by at least one product object.

31. The computer readable storage medium of claim 25 wherein the component object has a dependent relationship with one or more of the following: another component object; a category object; and a feature object.

32. The computer readable storage medium of claim 25 wherein the feature object is defined by at least one other feature object.

* * * * *